March 10, 1970  W. F. HAMILTON ETAL  3,499,723
ATMOSPHERIC POLLUTION CONTROL
Filed May 4, 1967
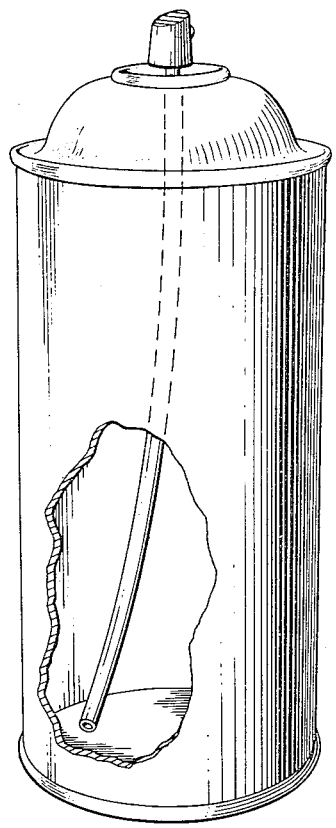
INVENTORS.
WILLIAM F. HAMILTON
ELI SIMON
BY
  Agent United States Patent Office 3,499,723
Patented Mar. 10, 1970

3,499,723
ATMOSPHERIC POLLUTION CONTROL
William F. Hamilton, Altadena, and Eli Simon, Los Angeles, Calif., assignors to Lockheed Aircraft Corporation, Burbank, Calif.
Filed May 4, 1967, Ser. No. 636,056
Int. Cl. B01d 47/00; C09k 3/30
U.S. Cl. 23—4           2 Claims

ABSTRACT OF THE DISCLOSURE

Atmospheric pollution such as is commonly referred to as "smog" within areas illuminated by visible light can be reduced to levels which can be tolerated by plants and animals, including humans, by placing within the air within such an area an iodide compound. The compound may be placed in the air by being sprayed from a solution so as to form a mist. Preferably, the solution used is an iodide solution which has been chemically stabilized so that it will not deteriorate prior to its being used, containing compounds which are volatile under normal atmospheric conditions. Such a solution may be of an aerosol type.

BACKGROUND OF THE INVENTION

A great deal has been written about the various types of atmospheric pollution. One particular type of such pollution which has been relatively difficult to control is so-called "smog." The control of smog has been extensively studied and many different efforts have been made to control this type of atmospheric pollution so that it does not detrimentally affect plants and animals, the latter including human beings. The present day lack of success or acceptance of these prior efforts at smog-control is to a degree demonstrated by the existence of this form of atmospheric pollution in many areas.

A detailed understanding of the nature of "smog" is not necessary to an understanding of the present invention. This form of atmospheric pollution involves various nitrogen oxides and various different hydrocarbons, particularly olefinic hydrocarbons. These oxides tent to react in sunlight and in the presence of other materials so as to cause the production of ozone. Ozone is, of course, highly reactive. It reacts with various hydrocarbon pollutants so as to produce oxidation products such as aldehydes, ketones and the like. In the smog type of mechanism various free radicals are considered to to be formed, and these, in turn, react with oxygen so as to produce peroxide type free radicals which, in turn, react with further oxygen to produce ozone. Such ozone then continues to react, and so on.

Because of the nature of the various chemical reactions which contribute to smog or a smog-type of atmospheric pollution, it is considered impossible to adequately and completely classify all of such reactions, or to give any completely accurate measure of atmospheric pollution which can be tolerated. Since ozone concentration can be measured, and since ozone is a prime ingredient of a smog-type of atmospheric pollution condition, the ozone level of the atmosphere is frequently used as a means of measuring the degree of smog or smog-type atmospheric pollution.

It previously has been proposed to chemically control smog-type atmospheric pollution by placing iodine in the atmosphere as a free element. This type of subject matter is indicated in the Hamilton et al. U.S. Patent 3,084,024, issued Apr. 2, 1963, entitled "Chemical Smog Control" and in the Hamilton et al. U.S. Patent 3,230,033, issued Jan. 18, 1966, entitled Enclosed Chamber Air Purification Apparatus." The first of these patents pertains to suppressing atmospheric smog-type pollution by interjecting or introducing iodine into air where such iodine reacts to reduce the ozone level or concentration. The second of these patents indicates various ways where the principles of the first can be applied in an enclosed area through the use of a simple apparatus such as can be incorporated within an air-conditioning device for circulating air. In accordance with the latter patent, the iodine in the air is irradiated with a precise type of radiation in order to increase its effectiveness by dissociating the iodine into a more reactive form of this material.

Procedures such as are set forth in the aforenoted patents suffer from various disadvantages and limitations tending to inhibit their use. As an example of this, iodine crystals, per se, are sometimes classified as toxic, even though moderate quantities of iodine itself are tolerated by living things, including humans, and in many cases are considered to be beneficial for certain purposes. Also, it is obviously comparatively expensive to install specialized equipment for the purpose of vaporizing and irradiating iodine. As a result of these and other factors, it is not considered that the procedures for smog-type atmospheric pollution control set forth in the aforenoted Hamilton et al. patents can be adapted so as to be acceptable for use at a nominal cost within a comparatively small area. Hence, although the procedures set forth in these Hamilton et. al. patents are considered to be effective from a technical standpoint, they are not considered to meet certain needs in the field of smog pollution control.

SUMMARY OF THE INVENTION

These needs are of several categories. It is considered that, from a commercial standpoint, there is a definite need to control smog-type atmospheric pollution without the use of elementary iodine. Also, commercially there is the need for simple effective, comparatively low-cost methods and devices for use in controlling smog-type atmospheric pollution with enclosed areas. This invention has as its primary objects the satisfaction of these needs. Various other objectives of this invention will be apparent from subsequent portions of this specification and the appended claims.

By way of summary, it can be indicated that the invention concerns a method of suppressing smog-type atmospheric pollution by placing an iodide compound within visibly illuminated air containing atmospheric pollutants or potential pollutants. The invention also concerns placing such a compound in air by forming a solution of such a compound and spraying the solution into the air so as to form a mist so that the compound is presented to various atmospheric pollutants in a comparatively finely divided form.

By way of summary, it can also be indicated that the present invention concerns stable solutions for use in practicing this invention which contain at least one solvent, at least one iodine compound, and a stabilizer for the iodine compound. Such a solution preferably contains, as a co-solvent, a conventional aerosol propellant, but it may be used with an inert or substantially inert propellant gas. Although a number of different iodine compounds are capable of being used, in either practicing this method or in the formation of such solutions, it is presently preferred to use iodide compounds which are volatile under normal amtospheric temperature and pressure conditions.

BRIEF DESCRIPTION OF THE DRAWING

The figure of the accompanying drawing is intended to illustrate a presently preferred embodiment or form of an aersol type device for use in practicing the present invention. From this specification it will be apparent, however, that the invention is not to be considered as being limited in any manner by the precise illustration in the drawing.

DETAILED DESCRIPTION OF THE INVENTION

In the presently preferred manner of practicing this invention, a solution of an iodide compound is first prepared, and then is discharged in the form of mist into the air in an area where it is subject to visible radiation. The composition of such a solution may be varied within comparatively wide limits.

Virtually any iodide compound which is photosensitive in character in that it is capable of being decomposed by visible light is capable of being used with this invention. Various inorganic compounds which are considered to be suitable are compounds such as potassium and sodium iodide since these compounds are relatively soluble in most solvents. Other inorganic compounds such as calcium iodide, magnesium iodide and the like can, at least in theory, be employed in this invention. Various organic compounds such as ethyl iodide, methyl iodide and the like can also be used. It is presently preferred, however, to use as the iodide compound ammonium iodide since this compound sublimes at room temperature. This facilitates the introduction of this particular compound into the atmosphere, and tends to effectively eliminate any reasonable possibility of permanent staining resulting from contact of this compound with various ambient articles as the invention is practiced.

Although the method of the invention may be carried out by merely vaporizing a compound such as ammonium iodide, or a compound such as the other iodides indicated in the preceding by placing such a compound upon a receptacle which is heated sufficiently hot to cause such vaporization, it is preferred to practice the present invention by spraying a solution of such an iodide compound into the air being treated. Preferably such spraying is carried out so that the solution is broken up into as small particles or drops or droplets of the solution as reasonably possible, as in the formation of a mist of such a solution.

The solution used in the preceding manner can, at least in theory, be virtually of any type having a viscosity permitting the solution itself to be sprayed. It is presently considered that the composition of the solution should be controlled very carefully so that the solution itself is of such a character permitting the solution to be stored over long periods. It is also considered that the composition of the solution must be controlled so that the use of the solution will not cause any toxicity problems and so that the chances of any staining resulting from the use of the solution are effectively minimized and/or eliminated.

Although iodide compounds are capable of being placed in solution in a wide variety of different solvents, in effect, only two common solvents are acceptable with the present invention because of the toxicity problem. These are water and ethyl alcohol. Of the two, the alcohol is considered to be the preferred solvent for use in the formation of aerosol-type solutions capable of being propelled using conventional propellants. A mixture of such solvents can, of course, be used with this invention. In order to increase the solubility of the iodide compound employed it is possible to use a minor amount of other non-toxic compounds such as triethylene glycol with ethanol as a secondary type solvent.

For purely practical reasons, it is normally desired that the solution formed contains as much iodide as is conventiently possible to place in solution in the particular solvent or solvent system employed. The amount of such iodide compound which can be placed in solution will, of course, vary, depending upon the precise iodide used, and the precise solvent or solvent system used. This can be determined by simple routine experimentation.

Preferably the solution used also contains a stabilizer which tends to inhibit or prevent degradation of the iodide compound upon prolonged storage of the solution. If the iodide solution is to be used in accordance with this invention within a relatively short period, such as immediately after the formation of such a solution, it is not considered that such a stabilizer is necessary. Any stabilizer used must be soluble in the solvent or solvent system employed. Preferably it should be relatively volatile under normal atmospheric conditions and should not cause any significant staining or toxicity effects.

A presently preferred stabilizer for use in solutions as herein described is ammonium hypophosphite. When present in amounts of about 1% of the weight of iodide present in a solution as herein described, this stabilizer effectively prevents the deterioration of the presently various iodide compounds such as the preferred iodide compound for use with this invention, ammonium iodide. It is considered that other stabilizers can, of course, be employed to prevent degradation of iodide compounds within solutions.

Although it is not necessary, it is presently considered that a solution of the present invention should contain, for aesthetic reasons, a small amount of a conventional perfume which is inert with respect to the other ingredients of the solution. The amount of such perfume employed should be just adequate to give an olefactory indication to a human of the use of the composition of this invention. This is to provide an olefactory indication as to when the present invention is being utilized, and to satisfy certain psychological desires by persons using the invention.

As an example of a solution of the present invention, a solution can be prepared using 33 parts by weight absolute ethanol, one part by weight triethylene glycol, one part by weight potassium iodide and one part by weight of ethyl iodide. Such a solution may be used to control atmospheric smog type pollution in an enclosed room illuminated by visible light by merely being sprayed into such a room through the use of a conventional aspirator. Such an aspirator will, of course, create a mist of this solution in the air in such a room or area. This method of practicing one aspect of the invention can be carried out in either a room occupied by humans or other animals, or in an enclosed space used for growing plants.

Care should be used in exercising this method of practicing the invention because of the possible staining characteristics of this type of composition. When the foregoing formula is sprayed on objects, yellow staining may result, presumably because of a tendency for one or both of the iodides to enter into some unknown type of complex with the glycol, causing the sprayed solution to adhere to various objects. As a result of this factor, it is considered preferable not to use a solution such as the aforegoing where there is apt to be any damage caused by staining.

Another formulation which can be used in practicing this invention contains 2 parts by weight of ammonium iodide, 2/100 part by weight ammonium hypophosphite, and 40 parts by weight of absolute ethanol. A composition of this character may be used to control smog-type pollution as indicated in the preceding by being sprayed with an aspirator. Because of the fact that both the ammonium iodide and the ammonium hypophosphite are volatile at normal ambient temperature, the staining problem with this type of composition is substantially minimized or eliminated, and the composition, even if it should cause temporary staining, is not normally disadvantageous since such staining normally is only of temporary character, due to absence of the glycol.

Etiher of the compositions indicated in the preceding can, of course, be placed in the form of a mist in the atmosphere through other than the use of a conventional aspirator. As an example of this, air can be passed through a bath of such a composition in much the manner in which air is passed through water in a conventional evaporator type cooler. Similarly, a composition such as indicated in the preceding can be charged into a dispensing container held under pressure by an inert or substantially inert gas in a known type of vessel used to spray various different types of compositions.

It is preferred, however, to formulate a composition of this invention of a so-called aerosol type capable of being sprayed into the atmosphere so as to create a mist of extremely finely divided droplets, so as to produce in the air a condition where there is as great a total area of solution exposed to the air as is reasonably possible. A suitable composition for such use may contain the following: 2 parts by weight ammonium iodide, 2/100 part by weight ammonium hypophosphite, 5/100 part by weight a commercial Cashmere perfume Bouquet 7703, 37.93 parts by weight absolute ethanol, 25 parts by weight trichloro monofluoro methane (Freon F–11), and 35 parts by wieght dichlorodi-fluoro methane (Freon F–12). It will be recognized that this composition contains preferred ingredients as specified in the preceding. It is operative if the perfume is omitted.

A composition of this character may be charged into a conventional aerosol container as indicated in the accompanying drawing. Such a container has a conventional discharge type spray nozzle and valve which is actuated when it is pressed downwardly so as to release the contents of the container through the nozzle as such contents pass from a tube in the bottom of the container to the valve. The pressure for such discharge of the solution is derived from the methane derivatives which act as propellants as well as a part of the complete iodide solution.

This container illustrated may easily be used by the valve shown being actuated so as to discharge the contents of the container. Preferably these contents should be discharged into the central area of a room, greenhouse, or the like where there is visible light which will act upon the mist of the solution resulting from such discharge. When the solution is discharged in this manner, it is located in an area where it is most apt to come in contact with atmospheric pollutants so as to be effectual for its intended purpose. Further, generally in such an area there is a minimum of chance for the solution causing any undesirable effects.

In any of the aforegoing uses of a composition of the present invention, the amount of an iodide placed in contact with the air necessary to cause effectual suppression or minimization of atmospheric pollution will vary, depending upon a number of factors, such as the temperature of the room within which the solution is discharged, the amount of visible light within such a room, and the degree and type of the atmospheric pollutants present. As the term "pollutants" is used in this paragraph, it not only includes smog-type pollutants but various other olefactory detectable odors. Surprisingly, solutions of the present invention are effective as deodorants for various nonsmog-type atmospheric pollutants.

The amount of an iodide compound which should be placed in the atmosphere in order to effectively suppress or minimize the effect of atmospheric pollution under any given condition is best determined by experimentation. It is considered that only sufficient iodide compound should be used at any specific time to alleviate a particular atmospheric pollution problem. It is considered that the amount which should be used can be effectively determined in the usual circumstances by placing a limited amount of the iodide compound in the atmosphere within an enclosed area, waiting a period such as from 20 to 30 minutes, and then placing a similar limited amount in the atmosphere if the first amouit was not effective in accomplishing the desired results.

As an example of this, an aerosol container as discussed in the preceding can be discharged into the central area of a visibly illuminated room for a period of about one second. If, after 20 to 30 minutes it is apparent that atmospheric pollution remains a problem, the container can then be discharged for an equivalent period in the same area. It can be discharged again after a period of about 20 to 30 minutes if this is required in order to effectively control atmospheric pollution. From this description it will be recognized that atmospheric pollution control, in accordance with this invention, involves what is often referred to as a continuous variable situation. Even extremely small amounts of an iodide compound in air are effective to a degree in suppressing or minimizing atmospheric pollution.

Because of the nature of this invention and the various manners in which it can be utilized, it is to be considered as being limited solely by the appended claims forming a part of this disclosure.

We claim:

1. A process for suppressing atmospheric pollution within a visibly lighted area which comprises:
    placing within the air in said area a solution of ammonium iodide in an amount sufficient to suppress such pollution by spraying said solution of said compound into said area from an aerosol container so as to form a mist of said solution in said area;
    said solution having a solvent selected from the group consisting a water, ethyl alcohol and mixture thereof, and having a halogenated methane compound mixed with said solution so as to also serve as a solvent.

2. A solution for use in suppressing atmospheric pollution which comprises:
    at least one solvent selected from the group consisting of water and ethyl alcohol and mixtures thereof;
    at least one iodide compound which is soluble in said solvent and which is capable of being decomposed by visible light; and
    said iodide compound being ammonium iodide and said stabilizer being ammonium hypophosphite.

References Cited

UNITED STATES PATENTS

| 2,932,364 | 4/1960 | Binter | 23—2 X |
| 3,081,232 | 3/1963 | Powers et al. | 252—305 X |
| 3,084,024 | 4/1963 | Hamilton et al. | 23—4 |
| 3,132,068 | 5/1964 | Behrman | 252—188 X |

OSCAR R. VERTIZ, Primary Examiner

E. C. THOMAS, Assistant Examiner

U.S. Cl. X.R.

23—2; 252—188, 305